(12) United States Patent
Doshi et al.

(10) Patent No.: US 9,699,683 B1
(45) Date of Patent: Jul. 4, 2017

(54) SCALABLE EARLIEST ARRIVAL PATH (EAP) ALGORITHM FOR SIMULTANEOUS DIVERSITY TRANSMISSIONS OF BASE STATION SIGNALS

(71) Applicant: QUALCOMM Incorporated, San Diego, CA (US)

(72) Inventors: Jignesh Doshi, Carlsbad, CA (US); Ju-Yong Do, Cupertino, CA (US); Jordan Cookman, San Jose, CA (US); Guttorm Ringstad Opshaug, Redwood, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/411,483

(22) Filed: Jan. 20, 2017

(51) Int. Cl.
| | |
|---|---|
| *H04W 24/00* | (2009.01) |
| *H04W 24/10* | (2009.01) |
| *H04W 4/02* | (2009.01) |
| *H04L 25/02* | (2006.01) |
| *H04W 40/24* | (2009.01) |
| *H04B 17/318* | (2015.01) |

(Continued)

(52) U.S. Cl.
CPC .......... *H04W 24/10* (2013.01); *H04W 4/02* (2013.01); *H04B 17/309* (2015.01); *H04B 17/318* (2015.01); *H04L 25/0204* (2013.01); *H04L 25/0226* (2013.01); *H04W 36/0083* (2013.01); *H04W 40/246* (2013.01)

(58) Field of Classification Search
CPC . H04B 17/309; H04B 17/318; H04L 25/0204; H04L 25/0226; H04W 24/10; H04W 36/0083; H04W 40/246
See application file for complete search history.

(56) References Cited

U.S. PATENT DOCUMENTS 8,730,925 B2 * 5/2014 Frank .................. G01S 5/10
  370/241
9,510,268 B2 * 11/2016 Opshaug ............. H04W 40/246
(Continued)

OTHER PUBLICATIONS

Yang J., et al., "Direct Path Detection Using Multipath Interference Cancelation for Communication-based Positioning System", EURASIP Journal on Advances in Signal Processing, Aug. 30, 2012, Retrieved from Internet on Sep. 16, 2016, http://asp.eurasipjournals.springeropen.com/articles/10.1186/1687-6180-2012-188, pp. 1-26.

*Primary Examiner* — Khalid Shaheed
(74) *Attorney, Agent, or Firm* — Muncy, Geissler, Olds & Lowe, P.C.

(57) ABSTRACT

Disclosed are techniques for detecting earliest arriving downlink signal peaks over all transmit diversity paths received at a same point in time. In an aspect, a wireless mobile device receives a wireless signal comprised of signals transmitted from a plurality of cells each providing a plurality of transmit diversity paths, calculates a channel energy response (CER) vector for each of the plurality of transmit diversity paths of each of the plurality of cells, constructs an overlaid CER vector for each of the plurality of cells, wherein the overlaid CER vector for a cell comprises an overlay of each CER vector of the plurality of transmit diversity paths of the cell, and determines an earliest arrival path of each of the plurality of cells based on the overlaid CER vector for that cell.

30 Claims, 7 Drawing Sheets

(51) Int. Cl.
*H04B 17/309* (2015.01)
*H04W 36/00* (2009.01)

(56) References Cited

U.S. PATENT DOCUMENTS

| | | | |
|---|---|---|---|
| 2013/0121187 A1* | 5/2013 | Das | H04W 36/0083 370/252 |
| 2013/0315168 A1 | 11/2013 | Frank et al. | |
| 2015/0071092 A1* | 3/2015 | Mirbagheri | H04L 1/0038 370/252 |
| 2015/0237565 A1 | 8/2015 | Opshaug et al. | |
| 2015/0282112 A1 | 10/2015 | Bialer et al. | |
| 2016/0156424 A1* | 6/2016 | Mirbagheri | G01S 1/20 375/227 |

* cited by examiner

SCALABLE EARLIEST ARRIVAL PATH (EAP) ALGORITHM FOR SIMULTANEOUS DIVERSITY TRANSMISSIONS OF BASE STATION SIGNALS

BACKGROUND

1. Field of the Disclosure

Aspects relate to a scalable earliest arrival path (EAP) algorithm for simultaneous diversity transmissions of base station signals.

2. Description of the Related Art

Wireless communication systems have developed through various generations, including a first-generation analog wireless phone service (1G), a second-generation (2G) digital wireless phone service (including interim 2.5G networks) and third-generation (3G) and fourth-generation (4G) high speed data/Internet-capable wireless services. More recently, Long Term Evolution (LTE) has been developed by the $3^{rd}$ Generation Partnership Project (3GPP) as a radio access network technology for wireless communication of high-speed data and packetized voice for mobile phones and other mobile terminals. LTE has evolved from the Global System for Mobile Communications (GSM) system and from derivatives of GSM, such as Enhanced Data rates for GSM Evolution (EDGE), Universal Mobile Telecommunications System (UMTS), and High-Speed Packet Access (HSPA).

To locate a wireless mobile device (referred to as a user equipment (UE) in LTE) geographically, there are several approaches. One is to use some form of terrestrial radio location based on measurements made by the wireless mobile device of signals transmitted by wireless network base stations and access points (APs) and/or based on measurements made by network elements (e.g., base stations and/or APs) of signals transmitted by the wireless mobile device. Another approach is to use a Global Positioning System (GPS) receiver or Global Navigation Satellite System (GNSS) receiver built into the wireless mobile device itself. Terrestrial radio location in a cellular telephony system may use measurements made by the wireless mobile device of transmission timing differences between pairs of base stations or APs and may employ trilateration or multilateration techniques to determine the position of the wireless mobile device based on two, or more commonly three or more, timing difference measurements.

One such terrestrial radio location method that is applicable to measurements of LTE base stations (referred to as eNodeBs or eNBs) and that is standardized by 3GPP in 3GPP Technical Specifications (TSs) 36.211, 36.305, and 36.355 is Observed Time Difference of Arrival (OTDOA). OTDOA is a multi-lateration method in which the wireless mobile device measures the time difference between specific Radio Frequency (RF) signals from several eNodeBs and either computes a location itself from these measurements or reports the measured time differences to a location server, such as an Enhanced Serving Mobile Location Center (E-SMLC) or a Secure User Plane Location (SUPL) Location Platform (SLP), which then computes the wireless mobile device's location. In either case, the measured time differences and knowledge of the eNodeBs' locations and relative transmission timing are used to calculate the wireless mobile device's position.

The same RF signal may take multiple paths from the signal source, e.g., an antenna of the eNodeB, to the receiver, e.g., an antenna of the wireless mobile device. Determining the Earliest Arrival Path (EAP), or the most direct RF signal from the signal source to the receiver, is an important function for accurately determining the position of the wireless mobile device using OTDOA. Current techniques for determining EAP, however, often fail to accurately identify the EAP.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for detecting earliest arriving downlink signal peaks over all transmit diversity paths received at a same point in time includes receiving, at a wireless mobile device, a wireless signal comprised of signals transmitted from a plurality of cells, each cell of the plurality of cells providing a plurality of transmit diversity paths, calculating, by the wireless mobile device, a channel energy response (CER) vector for each of the plurality of transmit diversity paths of each cell of the plurality of cells, constructing, by the wireless mobile device, an overlaid CER vector for each cell of the plurality of cells, wherein the overlaid CER vector for a cell comprises an overlay of each CER vector of the plurality of transmit diversity paths of the cell, and determining, by the wireless mobile device, an earliest arrival path (EAP) of each cell of the plurality of cells based on the overlaid CER vector for that cell.

In an aspect, an apparatus for detecting earliest arriving downlink signal peaks over all transmit diversity paths received at a same point in time includes a transceiver configured to receive a wireless signal comprised of signals transmitted from a plurality of cells, each cell of the plurality of cells providing a plurality of transmit diversity paths, and at least one processor configured to: calculate a CER vector for each of the plurality of transmit diversity paths of each cell of the plurality of cells, construct an overlaid CER vector for each cell of the plurality of cells, wherein the overlaid CER vector for a cell comprises an overlay of each CER vector for the plurality of transmit diversity paths of the cell, and determine an EAP of each cell of the plurality of cells based on the overlaid CER vector for that cell.

In an aspect, an apparatus for detecting earliest arriving downlink signal peaks over all transmit diversity paths received at a same point in time includes means for receiving a wireless signal comprised of signals transmitted from a plurality of cells, each cell of the plurality of cells providing a plurality of transmit diversity paths, means for calculating, by the wireless mobile device, a CER vector for each of the plurality of transmit diversity paths of each cell of the plurality of cells, means for constructing an overlaid CER vector for each cell of the plurality of cells, wherein the overlaid CER vector for a cell comprises an overlay of each CER vector of the plurality of transmit diversity paths of the cell, and means for determining an EAP of each cell of the plurality of cells based on the overlaid CER vector for that cell.

In an aspect, a non-transitory computer-readable medium storing computer-executable instructions for detecting earliest arriving downlink signal peaks over all transmit diversity paths received at a same point in time includes computer-executable instructions comprising at least one instruction to cause a wireless mobile device to receive a wireless signal comprised of signals transmitted from a plurality of cells, each cell of the plurality of cells providing a plurality of transmit diversity paths, at least one instruction to cause the wireless mobile device to calculate a CER vector for each of the plurality of transmit diversity paths of each cell of the plurality of cells, at least one instruction to cause the wireless mobile device to construct an overlaid CER vector for each cell of the plurality of cells, wherein the overlaid CER vector for a cell comprises an overlay of each CER vector of the plurality of transmit diversity paths of the cell, and at least one instruction to cause the wireless mobile device to determine an EAP of each cell of the plurality of cells based on the overlaid CER vector for that cell.

Other objects and advantages associated with the aspects disclosed herein will be apparent to those skilled in the art based on the accompanying drawings and detailed description.

BRIEF DESCRIPTION OF THE DRAWINGS

A more complete appreciation of aspects of the disclosure will be readily obtained as the same becomes better understood by reference to the following detailed description when considered in connection with the accompanying drawings which are presented solely for illustration and not limitation of the disclosure, and in which.

DETAILED DESCRIPTION

Figure 1:
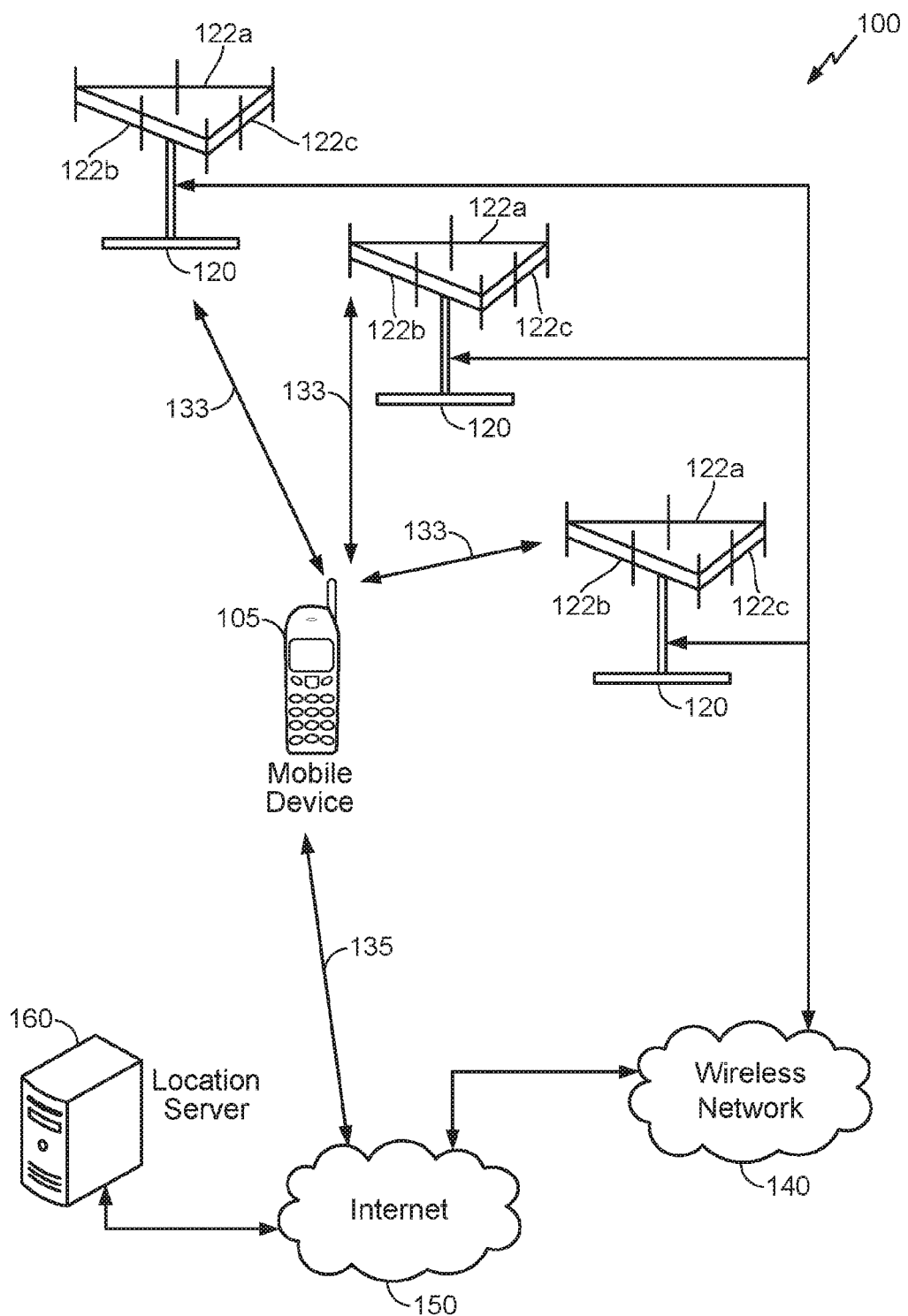
FIG. 1 is a simplified illustration of an aspect of a wireless wide area network capable of implementing techniques for determining an earliest arrival path (EAP) described herein.

Techniques are disclosed for detecting earliest arriving downlink signal peaks over all transmit diversity paths received at a same point in time. In an aspect, a wireless mobile device receives a wireless signal comprised of signals transmitted from a plurality of cells, each cell of the plurality of cells providing a plurality of transmit diversity paths, calculates a channel energy response (CER) vector for each of the plurality of transmit diversity paths of each cell of the plurality of cells, constructs an overlaid CER vector for each cell of the plurality of cells, wherein the overlaid CER vector for a cell comprises an overlay of each CER vector of the plurality of transmit diversity paths of the cell, and determines an earliest arrival path (EAP) of each cell of the plurality of cells based on the overlaid CER vector for that cell.

These and other aspects of the disclosure are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a wireless mobile device, may communicate with a wired access network and/or a radio access network (RAN). As used herein, the term "wireless mobile device" may be referred to interchangeably as an "access terminal" or "AT," a "wireless device," a "subscriber device," a "subscriber terminal," a "subscriber station," a "user terminal" or "UT," a "mobile device," a "mobile terminal," a "mobile station," a "user equipment" or "UE," and variations thereof. In an aspect, wireless mobile devices can communicate with a core network via the RAN, and through the core network the wireless mobile devices can be connected with external networks such as the Internet. Of course, other mechanisms of connecting to the core network and/or the Internet are also possible for the wireless mobile devices, such as over wired access networks, WiFi networks (e.g., based on Institute of Electrical and Electronics Engineers (IEEE) 802.11, etc.) and so on. Wireless mobile devices can be embodied by any of a number of types of devices including but not limited to cellular telephones, personal digital assistants (PDAs), pagers, laptop computers, desktop computers, printed circuit board (PC) cards, compact flash devices, external or internal modems, wireless or wireline phones, and so on. A communication link through which wireless mobile devices can send signals to the RAN is called an uplink channel (e.g., a reverse traffic channel, a reverse control channel, an access channel, etc.). A communication link through which the RAN can send signals to wireless mobile devices is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

A wireless wide area network (WWAN), such as a cellular network, can utilize mobile telecommunication cellular network technology to enable wireless mobile devices, such as cellular phones, tablets, personal digital assistants (PDAs), and/or other mobile wireless devices, to transmit and receive data over a large geographical region using cell towers or base stations. FIG. 1 is a simplified illustration of a WWAN 100 capable of implementing the techniques described herein, according to at least one aspect of the disclosure. The WWAN 100 can include at least one wireless mobile device 105, a wireless network 140, base stations 120 (which, in LTE, are referred to as "evolved Node Bs," "eNodeBs," or "eNBs"), a location server 160 (which, in LTE, may be an Enhanced Serving Mobile Location Center (E-SMLC) or a Secure User Plane Location (SUPL) Location Platform (SLP)), and the Internet 150. As illustrated in FIG. 1, each base station 120 includes three arrays of antennas, antenna arrays 122a, 122b, and 122c. Each antenna array 122a, 122b, and 122c may include one or more antennas. For an eNodeB, for example, each antenna array 122a, 122b, and 122c may include two to four transmit antennas (i.e., antennas for transmitting downlink signals to the wireless mobile device 105). Each antenna array 122a, 122b, and 122c corresponds to a "cell" of the base station 120 that can provide cellular connectivity to wireless mobile devices 105 within its coverage area.

It should be noted that FIG. 1 provides only a generalized illustration of various components, any or all of which may be utilized as appropriate, and each of which may be duplicated as necessary. For example, although only one wireless mobile device 105 is illustrated, it will be understood that many wireless mobile devices (e.g., hundreds, thousands, millions, etc.) may be utilized in the WWAN 100. Similarly, WWAN 100 may include many more base stations 120 than the three shown in FIG. 1. Even so, some aspects may have fewer base stations 120. Further, although base stations 120 are illustrated as having three arrays of antennas (and thus three "cells") forming a triangle, it will be appreciated that there may be more or fewer arrays of antennas and/or the arrays of antennas may be arranged in different shapes. Furthermore, components may be rearranged, combined, separated, substituted, and/or omitted, depending on the desired functionality. A person of ordinary skill in the art will recognize many modifications to the components illustrated.

The base stations 120 can be linked to certain geographic locations, and therefore, can be utilized to enable positioning of the wireless mobile device 105. Such positioning may be used, for example, as a complement and/or an alternative to other positioning technologies (e.g., Satellite Positioning System (SPS)). The positioning of the wireless mobile device 105 using base stations 120 may be based on measurements that are indicative of the distance between the wireless mobile device 105 and the base stations 120. For example, each antenna array 122a, 122b, and 122c of the base stations 120 may be configured to transmit RF signals (such as cell-specific reference signals (CRS) and/or positioning reference signals (PRS)) to nearby wireless mobile devices 105 to enable the wireless mobile devices 105 to take measurements of RF signal timing differences between pairs of "cells" (e.g., pairs of antenna arrays 122a, 122b, and 122c). The wireless mobile device 105 can either calculate an estimate of its position based on these timing difference measurements, or send the measurements to the location server 160 using, for example, OTDOA positioning to enable the location server 160 to estimate the position of the wireless mobile device 105.

The base stations 120 are communicatively coupled to the wireless network 140 (e.g., a cellular network), which may be communicatively coupled with the Internet 150. The location server 160 can also be communicatively coupled with the Internet 150. Thus, the wireless mobile device 105 can communicate the timing difference measurements and/or an estimated location to the location server 160 via the Internet 150 and/or other data communication network via a first communication link 133 to one or more base stations 120 and/or by accessing the Internet 150 via a second communication link 135 (e.g., via a local wireless network).

As noted above, each antenna array 122a, 122b, and 122c of a given base station (of base stations 120) may include two to four transmit antennas (e.g., where the base station 120 is an eNodeB), or more than four in some implementations, with the two antenna configuration currently being more common. The transmit antennas of an antenna array (such as antenna arrays 122a, 122b, or 122c) may each be separated by about half a meter, which causes the RF signals they transmit to follow different signal paths from the transmit antennas to the wireless mobile device 105. Where there are two transmit antennas, these RF signal paths, also called transmit paths, are referred to as "Tx0" and "Tx1." Where there are four transmit antennas, the transmit paths are referred to as "Tx0," "Tx1," "Tx2," and "Tx3." To provide what is referred to as "transmission diversity," multiple transmit antennas of an antenna array may transmit RF signals (e.g., CRS or PRS positioning/reference signals) to the wireless mobile device 105. For example, for CRS, multiple transmit antennas of an antenna array may transmit at the same time (i.e., on the same subframe), but the frequency content may be different. For PRS, where transmit diversity is typically not explicitly called for by any specification or standard, some manufacturers use only one antenna, while others transmit PRS on different antennas at different times (i.e., on different subframes). Either way, where the base stations 120 employ transmission diversity, the wireless mobile device 105 will receive multiple RF signals (with differences for the path taken by each RF signal) from multiple transmit antennas of one or more antenna arrays 122a, 122b, and 122c. This enhances the reliability of the RF signals received at the wireless mobile device 105.

The timing difference measurements discussed above may involve a determination of the Earliest Arrival Path (EAP), or the most direct RF signal path, present in the two to four RF signals received from the transmit antennas of each antenna array 122a, 122b, or 122c. Note that each of the two to four RF signals may be comprised of multiple RF signal paths. For example, the signal from Tx0 may arrive at the wireless mobile device 105 by both a direct path and by a reflection off of a nearby building. As such, the EAP is not necessarily one out of the two to four RF signals, but rather, is one out of all the arriving RF signal paths present in all the RF signals.

Typically, rather than attempt to determine which RF signal received from the transmit antennas of antenna arrays 122a, 122b, or 122c contains the EAP, a wireless mobile device 105 will simply choose the transmit path from one of the transmit antennas for use in determining the EAP (e.g., Tx0). The EAP can then be used to determine the Time of Arrival (TOA) between the corresponding transmit antenna and the wireless mobile device 105, which can be the basis for the positioning determinations. For example, the TOA is the basis for the LTE standard OTDOA calculation. The TOA may additionally or alternatively be the basis for a variety of other positioning calculations involving tri- and/or multi-lateration, hyperbolic navigation, and the like.

Before the EAP can be calculated, however, the wireless mobile device 105 determines the Channel Energy Response (CER) (also referred to herein as the CER vector) for each received RF signal from the antenna arrays 122a, 122b, and 122c. Each CER will have a peak corresponding to the transmitted RF signal from each transmit antenna. Problematically, however, the CER can have multiple peaks due to multipath, noise, and/or other causes. Thus, the peak corresponding to the most direct path (i.e., the EAP) should be identified in order to determine the TOA.

Peaks can be defined as high points in the CER vector. In some aspects, there may be specific qualifications. In some aspects, for example, a peak is defined as a point (or sample) in the CER vector with an amplitude higher than the two previous neighboring points and also higher than the one neighboring point that immediately follows. It should be noted that the largest peak of the CER vector does not necessarily indicate the shortest path. For example, an RF signal pathway around a building may result in a stronger signal than an RF signal pathway through the building, although the pathway through the building is more direct. Thus, the determination of the EAP can be difficult. Aspects described herein relate to techniques for improved EAP detection.

Figure 2:
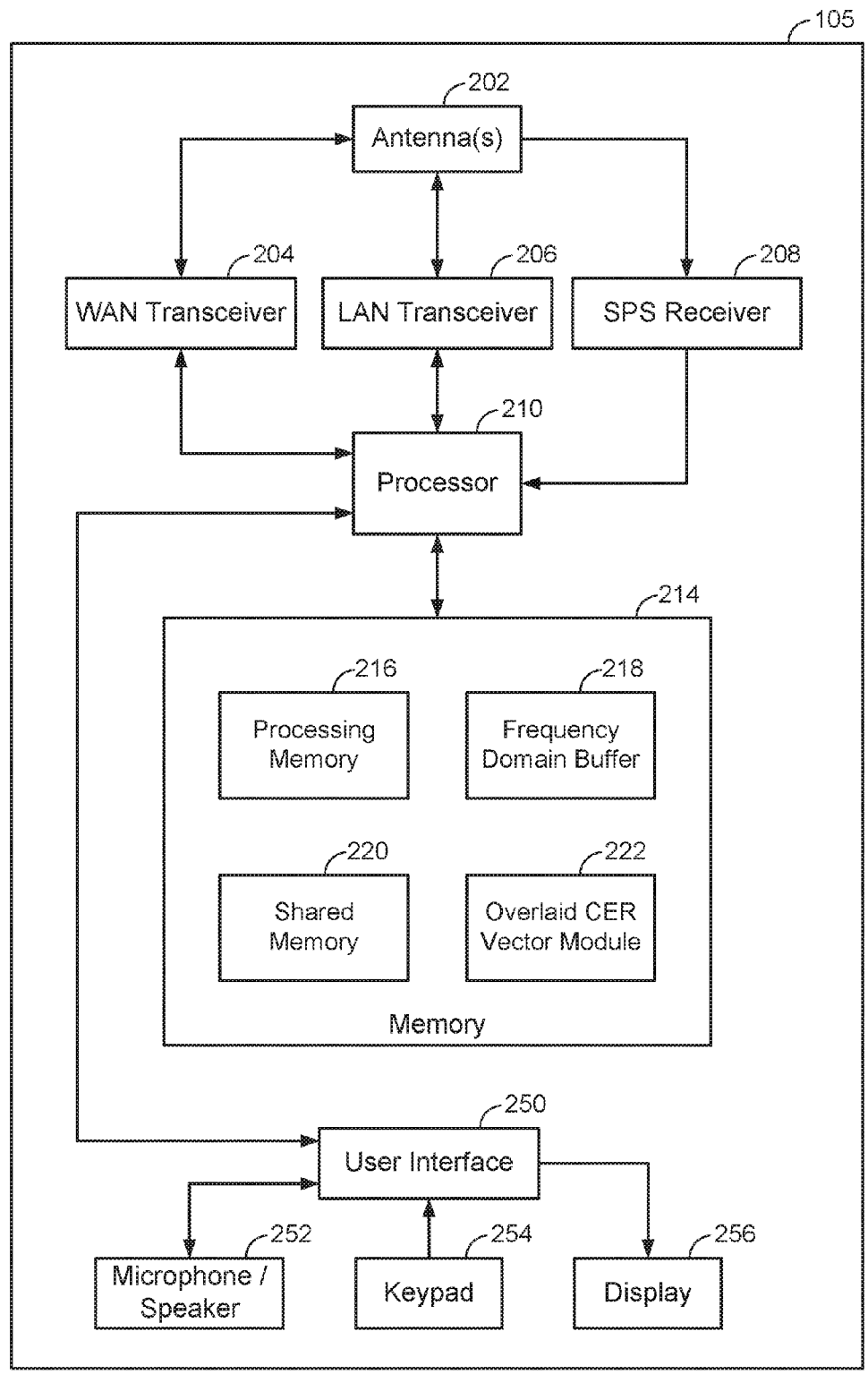
FIG. 2 illustrates an exemplary wireless mobile device that may be used in an operating environment that can determine position using wireless techniques, according to one aspect of the disclosure.

FIG. 2 is a block diagram illustrating various components of the exemplary wireless mobile device 105. For the sake of simplicity, the various features and functions illustrated in the box diagram of FIG. 2 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2 may be further subdivided or two or more of the features or functions illustrated in FIG. 2 may be combined.

The wireless mobile device 105 may include one or more wide area network (WAN) transceiver(s) 204 that may be connected to one or more antennas 202. The WAN transceiver 204 comprises suitable devices, hardware, and/or software for communicating with and/or detecting signals to/from the base stations 120, and/or directly with other wireless devices within a network. In one aspect, the WAN transceiver 204 may comprise a code division multiple access (CDMA) communication system suitable for communicating with a CDMA network of wireless base stations; however in other aspects, the wireless communication system may comprise another type of cellular telephony network, such as, for example, time division multiple access (TDMA) or GSM. Additionally, any other type of wide area wireless networking technologies may be used, for example, Worldwide Interoperability for Microwave Access (WiMAX) (defined in IEEE 802.16), etc.

The wireless mobile device 105 may also include one or more local area network (LAN) transceivers 206 that may be connected to one or more antennas 202. The LAN transceiver 206 comprises suitable devices, hardware, and/or software for communicating with and/or detecting signals to/from LAN access points, and/or directly with other wireless devices within a network. In one aspect, the LAN transceiver 206 may comprise a Wi-Fi (802.11x) communication system suitable for communicating with one or more wireless access points; however in other aspects, the LAN transceiver 206 may comprise another type of local area network, personal area network, (e.g., Bluetooth®). Additionally, any other type of wireless networking technologies may be used, for example, Ultra Wide Band, ZigBee, wireless USB, etc.

An SPS receiver 208 may also be included in the wireless mobile device 105. The SPS receiver 208 may be connected to the one or more antennas 202 for receiving satellite signals. The SPS receiver 208 may comprise any suitable hardware and/or software for receiving and processing SPS signals. The SPS receiver 208 requests information and operations as appropriate from the other systems, and performs the calculations necessary to determine the UE 200's position using measurements obtained by any suitable SPS algorithm.

The processor 210 may be connected to the WAN transceiver 204, LAN transceiver 206, and the SPS receiver 208. The processor 210 may include one or more microprocessors, microcontrollers, and/or digital signal processors that provide processing functions, as well as other calculation and control functionality. The processor 210 may also include memory 214 for storing data and software instructions for executing programmed functionality within the wireless mobile device 105. The memory 214 may be on-board the processor 210 (e.g., within the same integrated circuit (IC) package), and/or the memory 214 may be external memory to the processor 210 and functionally coupled over a data bus.

A number of software modules and data tables may reside in memory 214 and be utilized by the processor 210 in order to manage both communications and positioning determination functionality, as described herein. More specifically, in view of such software, the processor 210 can be configured to perform methods such as those illustrated in FIGS. 5 and 6. As illustrated in FIG. 2, memory 214 may include a processing memory 216 (which, in some aspects, is resident on processor 210), a frequency domain buffer 218, and a shared memory 220. The memory 214 may also include an overlaid CER vector module 222 that, when executed, causes the processor 210 to calculate an overlaid CER vector as described herein. The frequency domain buffer 218 stores the frequency domain symbols (e.g., orthogonal frequency-division multiplexing (OFDM) symbols) that are input into the overlaid CER vector module 222. The shared memory 220 stores the overlaid CER vectors computed by the overlaid CER vector module 222. Note that in LTE, the RF signals are organized into subframes, and the subframes are comprised of multiple "OFDM symbols." Each OFDM symbol is comprised of multiple resource elements, each containing a single complex value. Those complex values can also be called "symbols."

One should appreciate that the organization of the memory contents as shown in FIG. 2 is merely exemplary, and as such the functionality of the modules and/or data structures may be combined, separated, and/or be structured in different ways depending upon the implementation of the wireless mobile device 105. Further, while the modules shown in FIG. 2 are illustrated in the example as being contained in the memory 214, it is recognized that in certain implementations such procedures may be provided for or otherwise operatively arranged using other or additional mechanisms. For example, all or part of the overlaid CER vector module 222 may be provided in firmware.

The wireless mobile device 105 may include a user interface 250 that provides any suitable interface systems, such as a microphone/speaker 252, keypad 254, and display 256 that allows user interaction with the wireless mobile device 105. The microphone/speaker 252 provides for voice communication services using the WAN transceiver 204 and/or the LAN transceiver 206. The keypad 254 comprises any suitable buttons for user input. The display 256 comprises any suitable display, such as, for example, a backlit liquid crystal display (LCD) display, and may further include a touch screen display for additional user input modes.

As used herein, the wireless mobile device 105 may be any portable or movable device or machine that is configurable to acquire wireless signals transmitted from, and transmit wireless signals to, one or more wireless communication devices or networks. Thus, by way of example but not limitation, the wireless mobile device 105 may include a radio device, a cellular telephone device, a computing device, a personal communication system (PCS) device, or other like movable wireless communication equipped device, appliance, or machine.

As described above, each base station may include antenna arrays 122a, 122b, and 122c, each including one or more antennas and each corresponding to a "cell" of the base station. The transmit antenna(s) of an antenna arrays 122a, 122b, or 122c can be used to provide transmission diversity, and thus enhance the reliability of the RF signals received at the wireless mobile device 105. For example, where the base stations 120 are LTE eNodeBs, the base stations 120 may have two to four transmit antennas, and thereby provide two to four transmit paths (one transmit path per transmit antenna) for transmission diversity.

Currently, OTDOA positioning techniques have not taken advantage of the transmission diversity that can be provided by base stations 120, such as an eNodeB. Specifically, a wireless mobile device 105 will typically only look at one of the received transmit paths (e.g., Tx0 or Tx1), but not both (or all four). As such, these positioning techniques may experience performance degradation due to various issues, such as lower measurement yield and poorer multipath resolution.

Figure 3A:
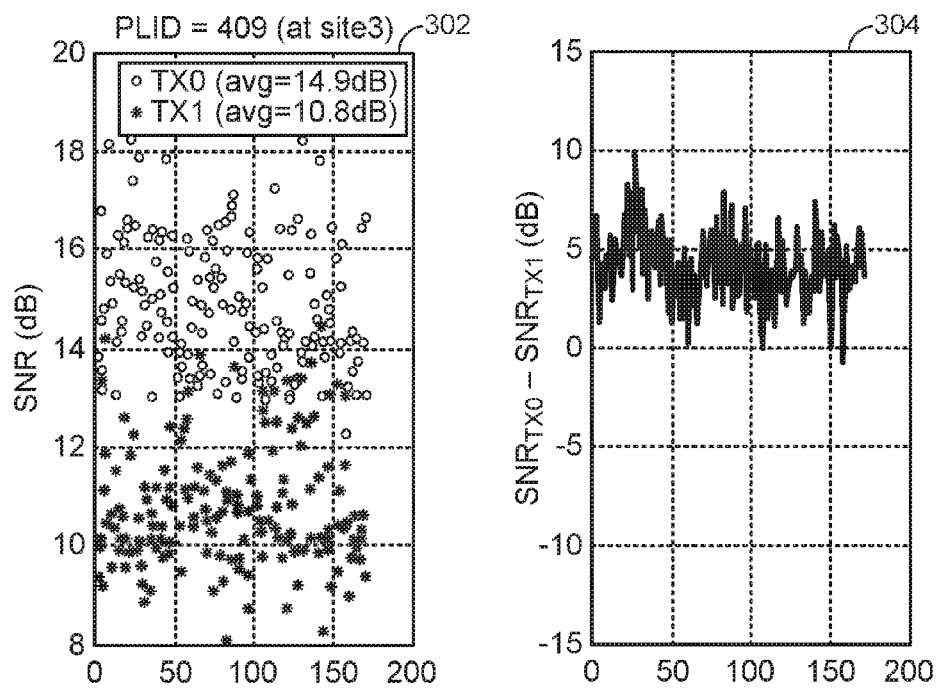
FIGS. 3A and 3B show various graphs illustrating exemplary differences in signal-to-noise ratio (SNR) between two transmit paths.

FIG. 3A shows two graphs illustrating an exemplary difference in signal-to-noise ratio (SNR) between two transmit paths, Tx0 and Tx1. As shown in graph 302, for a plurality of measurements (x-axis) collected at a particular location (in this experiment, site 3) for a given eNodeB (in this experiment an eNodeB having a Physical Layer Cell ID (PLID) of 409), the average SNR for transmit path Tx0 is 14.9 dB, and the average SNR for transmit path Tx1 is 10.8 dB. Graph 304 shows the difference between the SNR for transmit path Tx0 and the SNR for transmit path Tx1 over the same series of measurements (x-axis) as in graph 302.

Figure 3B:
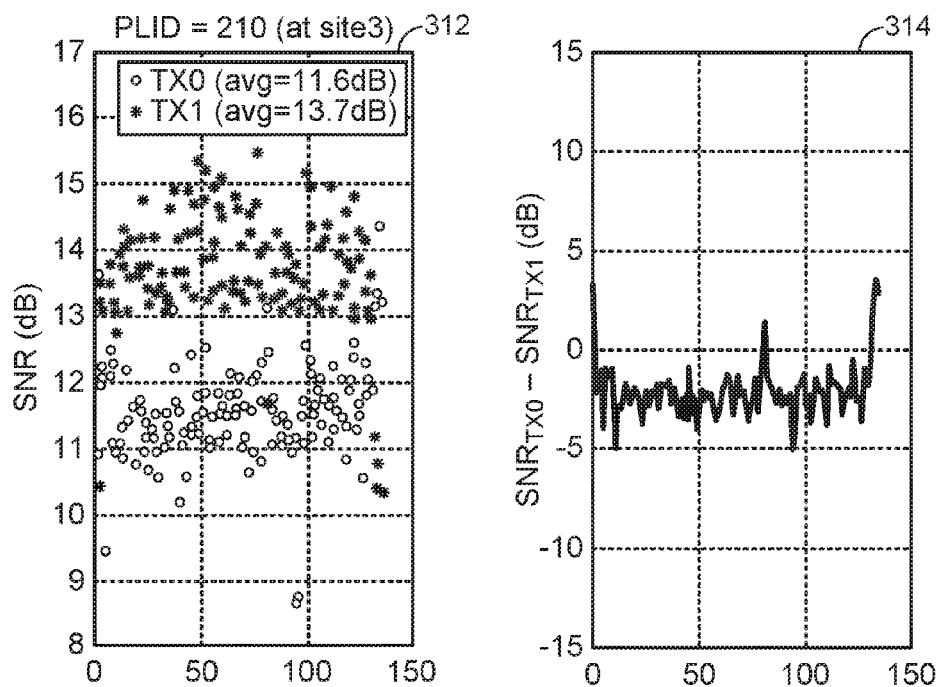

FIG. 3B shows two graphs illustrating an exemplary difference in SNR between two transmit paths, Tx0 and Tx1, received at the same location but from a different eNodeB. As shown in graph 312, for a plurality of measurements (x-axis) collected at site 3 for an eNodeB having a PLID of 210, the average SNR for transmit path Tx0 is 11.6 dB, and the average SNR for transmit path Tx1 is 13.7 dB. Graph 314 shows the difference between the SNR for transmit path Tx0 and the SNR for transmit path Tx1 over the same series of measurements (x-axis) as in graph 312. Thus, as can be seen, if the wireless mobile device 105 always uses the same transmit path for TOA measurements (e.g., transmit path Tx0), it will not always calculate the most accurate TOA measurements.

Referring to the issue of lower measurement yield, a blockage on the first transmit path (e.g., Tx0) of a neighbor cell (i.e., a cell with which the wireless mobile device 105 is not registered but from which it can receive RF signals) of a base station may result in measurement loss, even though this neighbor cell may be detectable on other transmit paths (e.g., Tx1, Tx2, and/or Tx3). For example, as shown in FIGS. 3A and 3B, SNR differences between transmit paths may be persistent and prominent. More specifically, as shown in FIGS. 3A and 3B, persistent differences can be observed between transmit paths. In the example illustrated in FIGS. 3A and 3B, an approximately 4 dB average difference may be observed between transmit paths Tx0 and Tx1. The dominant transmit path may differ per site (e.g., Tx0 may be stronger than Tx1 at a first site, while Tx1 may be stronger than a third transmit path (Tx2) at a second site) and thus, it may not be feasible to select one universally stronger transmission path (e.g., always selecting Tx0).

Referring to the issue of poorer multipath resolution, absence of a line-of-sight (LOS) signal on a first transmit path (e.g., Tx0) may result in large multipath error, while other transmit paths (e.g., Tx1, Tx2, and/or Tx3) may contain a detectable LOS signal.

Accordingly, proposed is a mechanism to optimally detect the EAP of received RF signals (e.g., the earliest arriving CRS/PRS peak) over all simultaneous base station transmission diversity transmit paths (i.e., the RF signals transmitted by multiple transmit antennas of antenna arrays 122a, 122b, or 122c, referred to herein as transmit paths Tx0 to Tx3). Note that for convenience, "transmission diversity transmit paths" are also referred to herein as "transmit diversity paths."

The proposed mechanism has a number of advantages. For example, the proposed mechanism will detect the EAP over all available transmission diversity transmit paths (e.g., transmit paths Tx0 to Tx3) for all cells indicated in the positioning assistance data received from the location server 160. For example, in LTE, the assistance data from the location server 160 may include information for ten cells. In that case, for two transmit antennas per cell sending the same RF signal, the wireless mobile device 105 will perform 20 measurements. In the case of four transmit antennas per cell sending the same RF signal, the wireless mobile device 105 will perform 40 measurements.

The proposed mechanism will also dynamically scale with higher order base station transmission diversity configurations. For example, the proposed mechanism can be used whether there are two, four, or some other number of transmit antennas sending the same RF signal per cell. Further, the proposed mechanism does not reduce cell search capacity per position fix request in order to achieve the increased transmission diversity measurements, and will not increase memory needs for any base station transmission diversity scheme, which is beneficial given that the internal and shared memory (e.g., memory 214) in the firmware (FW) of the wireless mobile device 105 is limited.

In addition, the proposed mechanism will measure all transmission diversity transmit paths at the same instance in time (i.e., at the same subframe) and at the same location (i.e., the location of the wireless mobile device 105). The proposed mechanism will also have a minimal power impact on the wireless mobile device 105 by reducing the total number of wakeups for measuring all transmit paths of all cells in the positioning assistance data from the location server 160. Although the FW processing timeline may increase somewhat for the wireless mobile device 105, as described below, this is far less power compared to an extra RF wakeup. Further, the proposed mechanism will not increase the time gap between measurements of different cells within a position fix request. Further still, the proposed mechanism will contain individual measurement uncertainty growth. More specifically, if each transmit diversity path is measured separately, the uncertainty can grow. However, with the proposed mechanism, the transmit diversity paths are measured simultaneously, which allows the uncertainty growth of individual transmit paths to be contained.

At a high level, the proposed mechanism begins with the FW of the wireless mobile device 105 (e.g., processor 210 in conjunction with the overlaid CER vector module 222) processing all transmission diversity transmit paths received at the wireless mobile device 105 for each cell in the positioning assistance data and constructing an overlaid CER vector for each cell that has two or more transmit antennas. The overlaid CER vector from a cell with four transmission diversity transmit paths is generated according to the equation:

$$\text{Overlaid\_CER}(i) = f(\text{CER\_Tx0}(i), \text{CER\_Tx1}(i), \text{CER\_Tx2}(i), \text{CER\_Tx3}(i))$$

for all $i^{th}$ taps, where $f$ is an overlay function that can be a maximum, average, SNR weighted average, hybrid/mixed, or dynamically switched function depending on the channel conditions on a particular transmission diversity path. For example, the "maximum" may be a maximum of the taps of the CER vectors, the "average" may be an average of the taps of the CER vectors, the "SNR weighted average" may be an SNR weighted average of the taps of the CER vectors, the "hybrid" may be a hybrid function that combines different overlaid functions described herein (e.g., maximum, average, SNR weighted average, etc.) for different subsets of taps of the CER vectors (e.g., a maximum of a first subset of taps of the CER vectors and an average of a second subset of taps of the CER vectors), and the "dynamically switched function" may be a dynamic function that switches between different overlaid functions described herein (e.g., maximum, average, SNR weighted average, etc.) or switches between combinations of different overlaid functions described herein based on channel conditions on given transmit diversity paths. Thus, the overlaid CER vector is a combination of the CER vectors for the four transmit paths of the cell.

Note that a CER vector (e.g., CER_Tx0(i), CER_Tx1(i), etc.) is a measure of the correlation between the transmitted RF signal (as transmitted by an antenna arrays 122a, 122b, or 122c) and the received RF signal (as received at the wireless mobile device 105) measured at different points in time. Each element of the CER vector is a function of all the elements in the RF signal. Further note that the elements i of the overlaid CER vector are referred to as "taps," and represent the CER of an RF signal at a particular point in time.

The equation would be similar for a cell having two or some other number of transmission diversity transmit paths, except that the overlay function $f$ would operate on the CER vectors for the number of transmit paths (e.g., CER_Tx0(i) to CER_TxN(i)). In this way, the overlay function $f$ is scalable to any number of transmit paths per cell. The EAP algorithm runs on this overlaid CER vector, thereby determining the EAP of all transmission diversity CER vectors per cell. For example, where there are ten cells with four transmit antennas per cell, the wireless mobile device 105 will calculate an overlaid CER vector for each cell, or ten CER vectors, rather than calculating the CER vector for each transmit path of each cell (which would be 40 CER vectors).

The EAP algorithm run on the overlaid CER vectors should choose the same transmit path that it would when the EAP algorithm is run separately on the CER vectors of each transmit path, and should select the best one. By running the EAP algorithm on the overlaid CER vector, the same performance is obtained as running the EAP algorithm on each transmit path separately, but only half of the memory is used. The overlaid CER vector may impact the noise floor; however, a detection threshold change can alleviate/reduce this impact. More specifically, by overlaying the various CER vectors to generate the overlaid CR vector, the noise floor could increase. However, even with the noise floor increase, this issue can be overcome by tweaking the false alarm threshold. In some cases, the false alarm threshold can by dynamically adjusted, for example, depending on how many CER vectors are being used to compute the overlaid CER vector. Further, using the proposed mechanism, the SNR is expected to go down, but it is also expected that the false alarm threshold can be lowered while keeping the false alarm rate the same.

The proposed algorithm causes only a minimal change to the FW of the wireless mobile device 105 (e.g., no or limited memory impact) and no memory impact or change to the upper layers of a terrestrial measurement engine. The FW memory impact is alleviated by processing each transmit path symbol (e.g., OFDM symbol) using the existing internal memory (e.g., memory 214) and overlaying output CER vectors at run-time on the existing shared memory for the corresponding cell. That is, as a new CER vector is calculated for a transmit path of a cell, the memory location for the previous CER vector can be replaced with the new CER vector.

As noted above, there may be different overlay functions, $f$, which can be selected for different reasons. For example, an overlay function that selects the maximum CER vector of the transmit paths of a cell may be beneficial when there is a large difference in received power on the transmit paths (as in FIGS. 3A and 3B), since the maximum would approach the strongest CER vector. However, if the power levels are substantially equal, then the noise level on the transmit paths would increase with no increase in signal.

Conversely, an overlay function, $f$, that selects the average CER vector of the transmit paths of a cell would be beneficial when the power levels of the transmit paths are relatively equal, since the noise would be de-emphasized. However, with large power differences, a weak signal would disproportionally impact the noise floor of the combined signal. The choice between the two overlay functions (maximum and average) may depend on the expectations for the typical differences in received power level of the transmit paths.

A "mixed" or "hybrid" overlay function may be calculated by taking the average for certain samples, or taps, of the transmit path (e.g., Tx0) and taking the maximum for other samples of the transmit path. For example, such an overlay function may calculate the average for samples far away from the CER peak of the transmit path and calculate the maximum for samples near the CER peak of the transmit path. The samples near the CER peak can be considered a first subset of taps, while the samples far away from the CER peak can be considered a second subset of taps. As will be appreciated, the first subset of taps and the second subset of taps could be anything, not merely samples near or far from the CER peak. Additionally, the selection of the first and second subsets could be dynamic.

As one example, testing was performed and it was found that for an SNR weighted average overlay function, the average SNR magnitude imbalance between Tx0 and Tx1 over 25 sites was 3.7 dB, and this was in a similar noise imbalance for both Tx0 and Tx1 of 0.9 dB. This shows that considering all transmit diversity paths can improve accuracy and detectability of a cell.

Figure 4A:
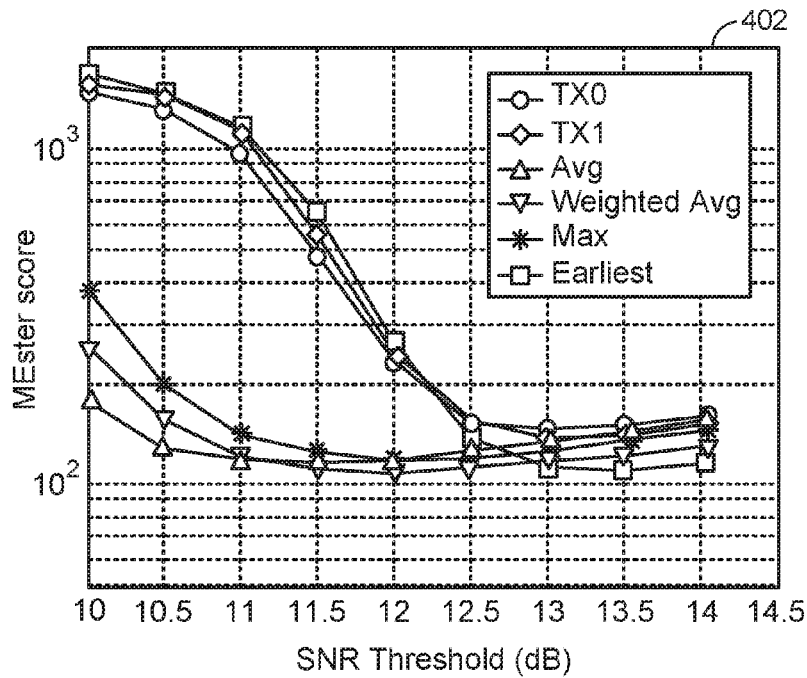
FIGS. 4A and 4B show various graphs comparing various scores for different SNR thresholds for two transmit paths and different overlay functions.
Figure 4B:
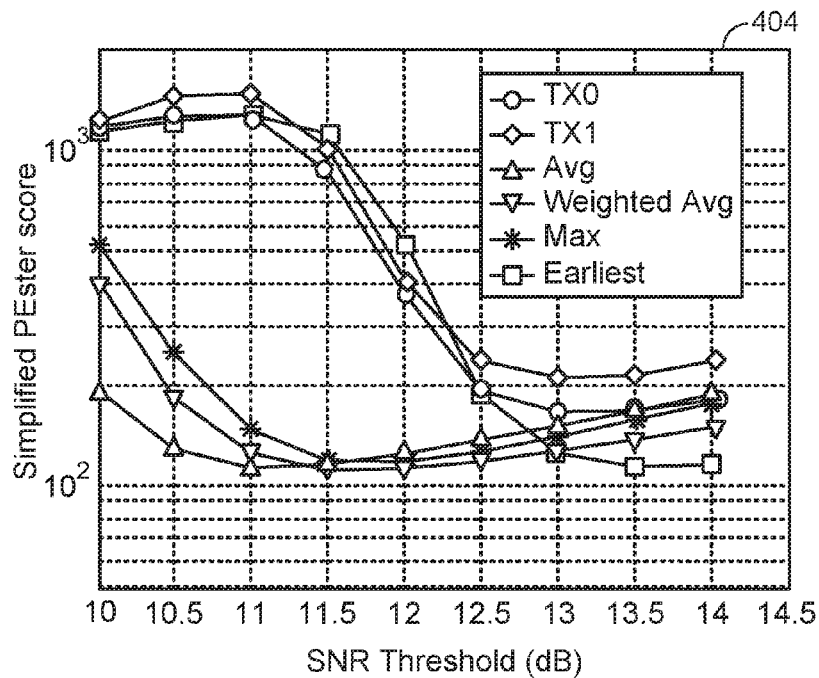

FIG. 4A shows a graph 402 comparing a measurement engine performance score (y axis, referred to in FIG. 4A as "MEster score") for different SNR thresholds (x axis) for two transmit paths (Tx0 and Tx1) and different overlay functions. The overlay functions illustrated are the average of the transmit paths, the weighted average of the transmit paths, the maximum of the transmit paths, and the earliest arriving transmit path. FIG. 4B shows a graph 404 comparing the positioning engine performance score (y axis, referred to in FIG. 4B as "PEster score") for different SNR thresholds (x axis) for two transmit paths (Tx0 and Tx1) and different overlay functions. As in FIG. 4A, the overlay functions illustrated are the average of the transmit paths, the weighted average of the transmit paths, and the maximum of the transmit paths. As a reference, a plot of the earliest arriving transmit path is also illustrated to show how the performance using an overlaid CER compares to the performance using individual CER's. The lower the measurement engine or positioning engine performance score, the better. More specifically, the lowest points of each curve represents their optimal operational setting. Thus, as can be seen in FIGS. 4A and 4B, the average overlay function is usually better, but not always, especially as the SNR threshold increases.

In various testing, it was confirmed that transmission diversity methods in general provide improved performance over non-transmission diversity methods. As such, further improving transmission diversity methods, as described herein, is beneficial.

Figure 5:
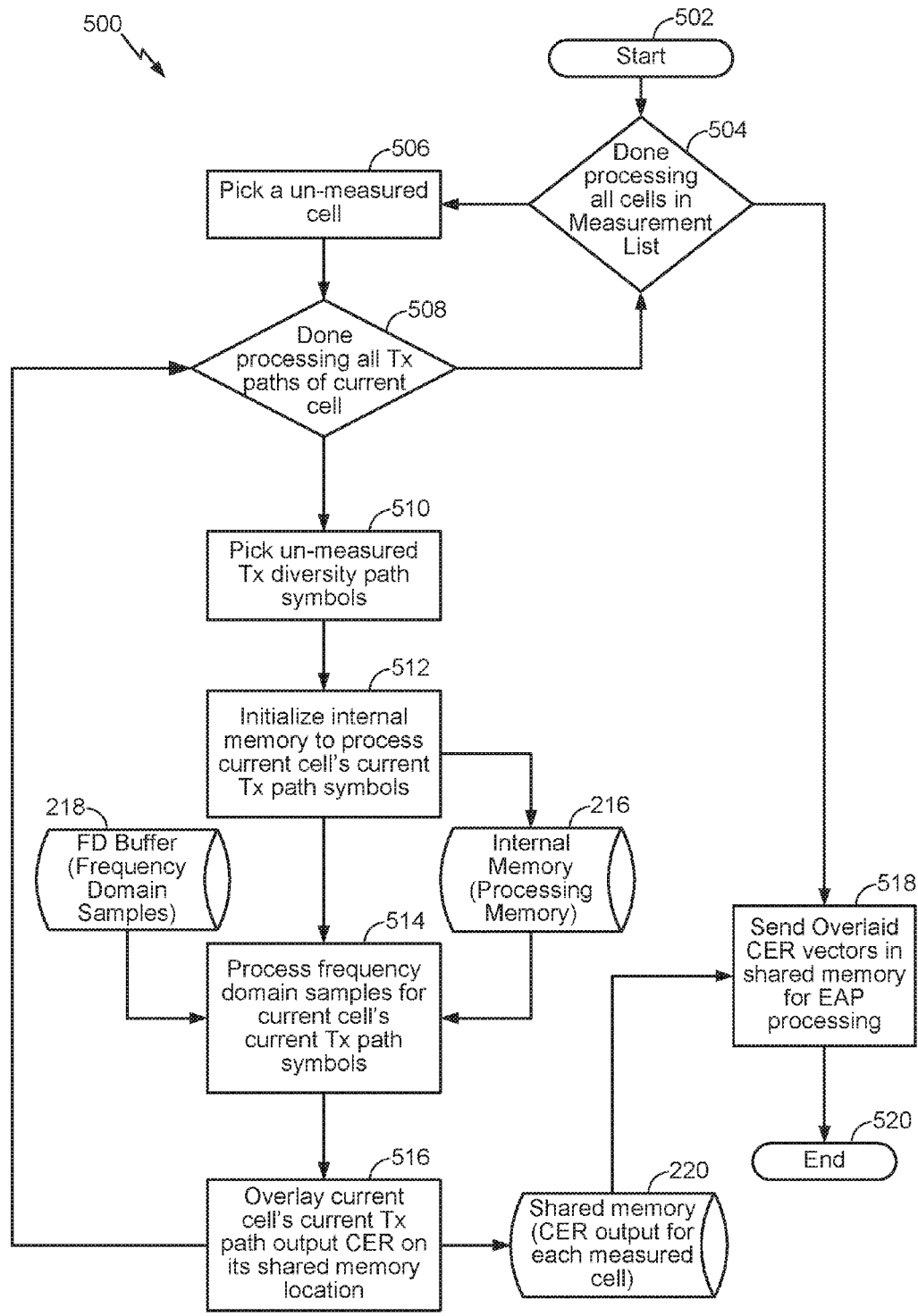
FIG. 5 illustrates an exemplary flow for calculating the overlaid Channel Energy Response (CER) vector according to an aspect of the disclosure.

FIG. 5 illustrates an exemplary flow 500 for calculating the overlaid CER vector according to an aspect of the disclosure. The flow 500 is described as being performed by the wireless mobile device 105. However, as will be appreciated, the flow 500 may be more specifically performed by the processor 210 executing the overlaid CER vector module 222, or by the overlaid CER vector module 222 by itself (where the overlaid CER vector module 222 is embodied in firmware or as a separate logic circuit), and in conjunction with the processing memory 216, the frequency domain buffer 218, and the shared memory 220.

The flow 500 begins at 502. At 504, the wireless mobile device 105 determines whether all cells in the positioning assistance data received from the location server 160 have been processed. As noted above, in LTE, the assistance data may include ten cells. If the wireless mobile device 105 has not processed all the cells in the assistance data, then at 506, the wireless mobile device 105 selects an unmeasured cell from the assistance data.

At 508, the wireless mobile device 105 determines whether all transmit paths for the current cell have been processed, that is, whether there are any remaining unprocessed transmit paths for the current cell. As noted above, in LTE, there are typically two or four transmit antennas, each transmitting an RF signal at the same time (i.e., during the same subframe) and at the same power level but potentially over different transmit paths (due, for example, to the physical separation between the transmit antennas). If there are no more transmit paths of the current cell to be processed, the flow returns to 504. However, if there is at least one transmit path to be processed, then the flow 500 proceeds to 510.

At 510, the wireless mobile device 105 selects a yet unprocessed transmit diversity path of the cell, which can comprise a set of unprocessed (e.g., unmeasured) transmit path symbols (e.g., OFDM symbols). At 512, the wireless mobile device 105 initializes the internal memory of processor 210, such as processing memory 216, to process the current cell's current transmit path symbols. At 514, the wireless mobile device 105 processes the frequency domain samples for the current cell's current transmit path symbols. The wireless mobile device 105 may read the frequency domain samples from the frequency domain buffer 218. The wireless mobile device 105 converts the frequency domain samples to time domain samples. The CER for the cell is then calculated when the time-domain samples are calculated. More specifically, the CER is the output of the time domain calculation.

At 516, the wireless mobile device 105 overlays the current cell's current transmit path's output CER vector on the shared memory location for that cell in the shared memory 220. The overlaid CER vector is computed tap by tap. That is, as a new CER vector is calculated for a transmit path of the cell at a given point in time (or for a given tap), it is combined with any previous CER vectors for that cell according to the overlay function $f$ to generate the overlaid CER vector. That is, in an aspect, the overlaid CER vector for the cell may be iteratively calculated as previously yet unprocessed transmit diversity paths of the cell are processed. More specifically, as a new output of the overlay function is calculated for a transmit diversity path of the plurality of transmit diversity paths of the cell, a previously stored output of the overlay function for the plurality of transmit diversity paths of the cell is overwritten by the new output. In this way, the processing memory 216 need only store a single CER vector per cell, rather than a CER vector for each transmit path of the cell. Note that in an aspect, the previously stored output of the overlay function may be stored in a memory of a system on a chip (SoC). The flow 500 then returns to 508.

As will be appreciated, operations 508-516 are repeated for all transmit paths of a cell, and operations 504-516 are repeated for all cells. Hence, in response to a determination that unprocessed transmit diversity paths of the cell remain, operations 508-516 are repeated for the remaining unprocessed transmit diversity paths of the cell. When all transmit paths of all cells have been processed ("yes" at 508 and 504), the flow 500 proceeds to 518. At 518, the wireless mobile device 105 sends the overlaid CER vectors in the shared memory 220 for EAP processing. As noted above, if there are ten cells with four transmit antennas per cell, the wireless mobile device 105 will calculate an overlaid CER vector for each cell, or ten CER vectors, rather than calculating the CER vector for each transmit path of each cell (which would be 40 CER vectors). The EAP processing will then be performed on ten overlaid CER vectors rather than 40 individual transmit path vectors. At 520, the flow 500 ends.

Figure 6:
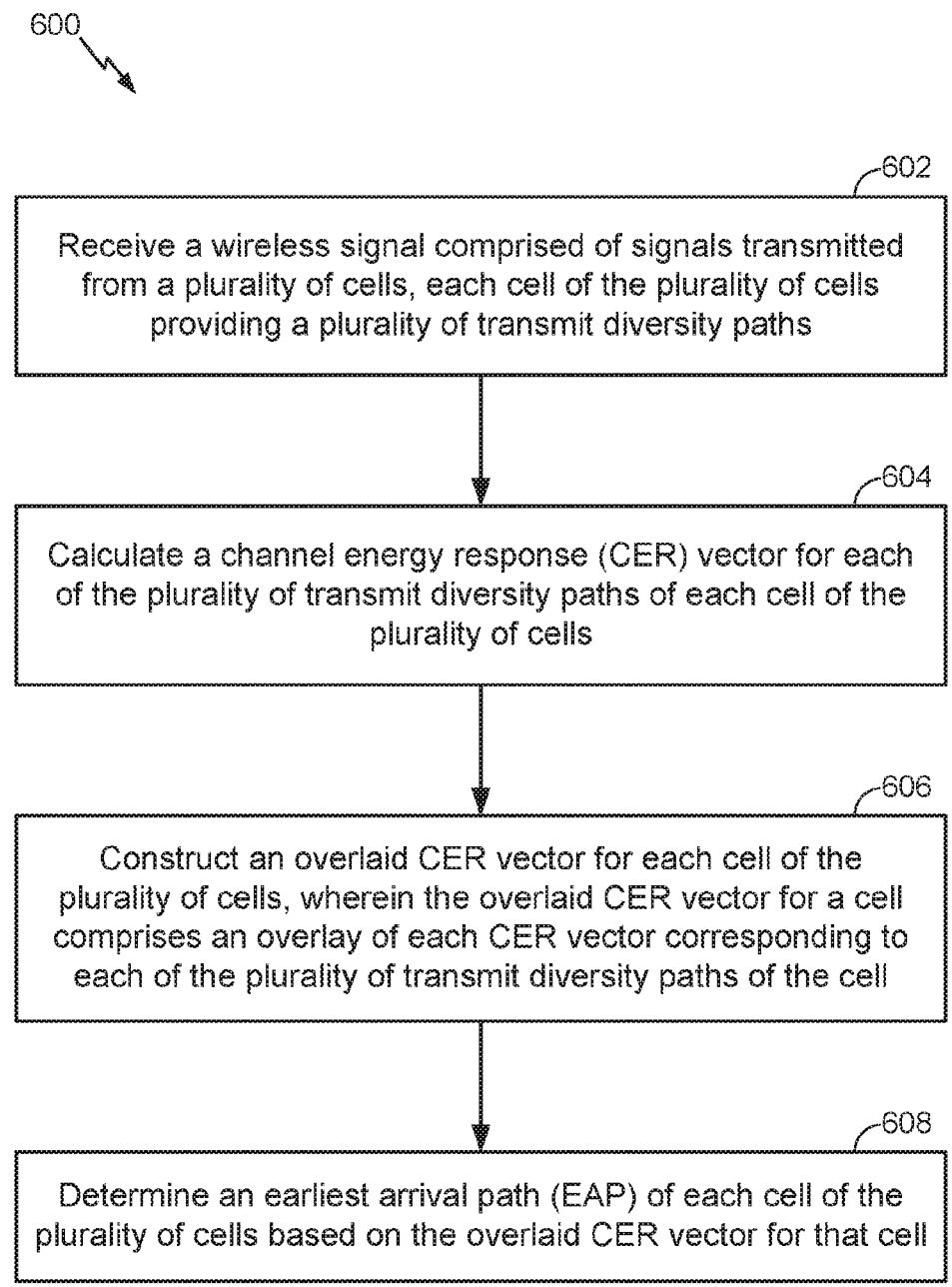
FIG. 6 illustrates an exemplary flow for detecting earliest arriving downlink signal peaks over all transmit diversity paths received at a same point in time.

FIG. 6 illustrates an exemplary flow 600 for detecting earliest arriving downlink signal peaks over all transmit diversity paths received at a same point in time. In an aspect, the flow 600 may be performed by the wireless mobile device 105.

At 602, the wireless mobile device 105 (e.g., WAN transceiver 204) receives a wireless signal comprised of signals transmitted from a plurality of cells (e.g., corresponding to antenna arrays 122a, 122b, and 122c). Each cell of the plurality of cells may provide a plurality of transmit diversity paths.

At 604, the wireless mobile device 105 (e.g., processor 210 in conjunction with processing memory 216, frequency domain buffer 218, shared memory 220, and/or overlaid CER vector module 222) calculates a CER vector for each of the plurality of transmit diversity paths of each cell of the plurality of cells, as described above.

In an aspect, calculating the CER vector for each of the plurality of transmit diversity paths of each cell of the plurality of cells at 604 includes, for each cell of the plurality of cells, selecting a yet unprocessed transmit diversity path of the cell, processing frequency domain samples for the yet unprocessed transmit diversity path, and converting the frequency domain samples to time domain samples. The overlaid CER vector for the cell may be iteratively calculated as previously yet unprocessed transmit diversity paths of the cell are processed. Further, as a new output of the overlay function is calculated for a transmit diversity path of the plurality of transmit diversity paths of the cell, a previously stored output of the overlay function for the plurality of transmit diversity paths of the cell is overwritten by the new output.

At 606, the wireless mobile device 105 (e.g., processor 210 in conjunction with processing memory 216, frequency domain buffer 218, shared memory 220, and/or overlaid CER vector module 222) constructs an overlaid CER vector for each cell of the plurality of cells, where the overlaid CER vector for a cell may comprise an overlay of each CER vector corresponding to each of the plurality of transmit diversity paths of the cell, as described above.

At 608, the wireless mobile device 105 (e.g., processor 210) determines an EAP of each cell of the plurality of cells based on the overlaid CER vector for that cell, as described above. In one implementation, the EAP of each cell of the plurality of cells is determined based only on the overlaid CER vector of that cell. The EAP is the earliest peak of the overlaid CER vector of the cell. Once the EAP for a given cell is determined, the mobile device 105 measures a TOA of the EAP. For a plurality of cells, the mobile device 105 measures a TOA of the EAP corresponding to each cell of the plurality of cells. The location of the wireless mobile device 105 may then be calculated based on the measured TOA of two or more cells of the plurality of cells.

Figure 7:
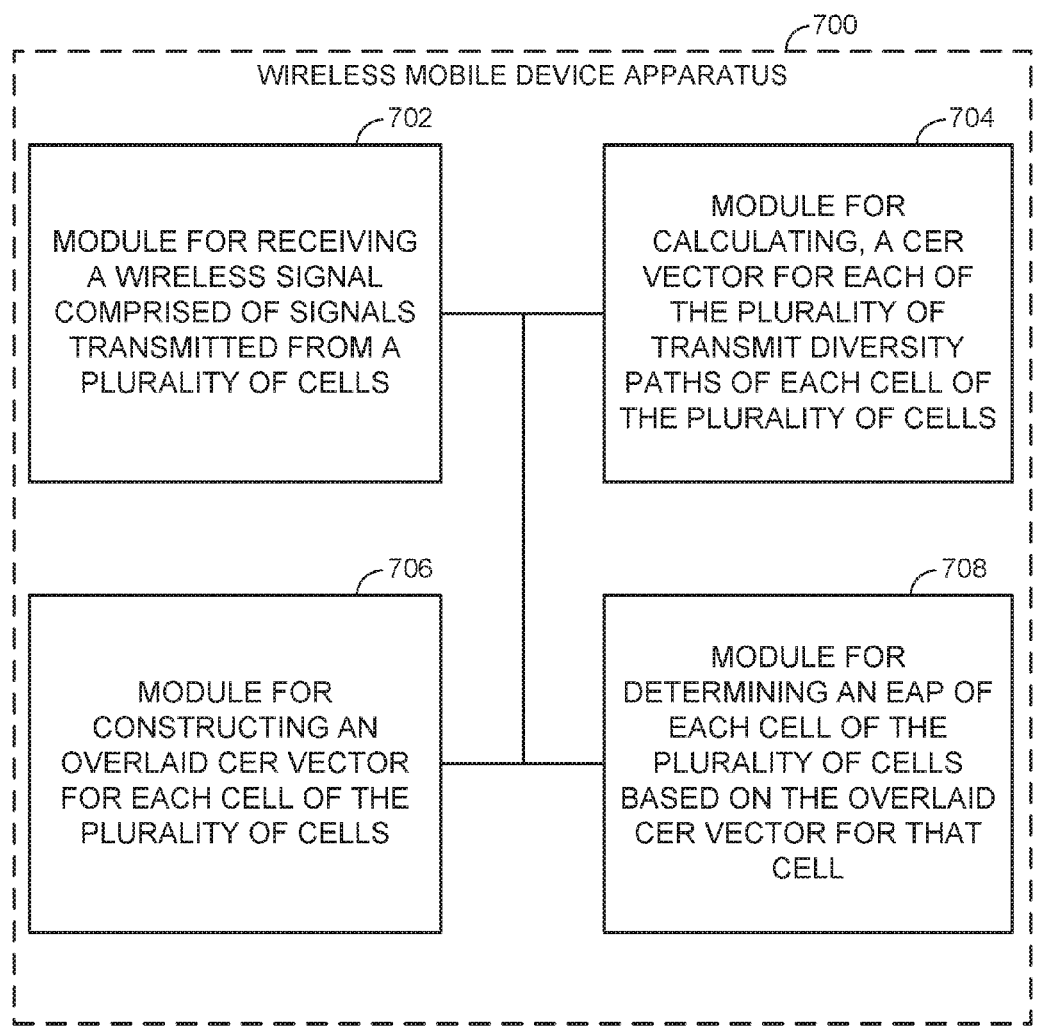
FIG. 7 is simplified block diagrams of several sample aspects of an apparatus configured to support communication as taught herein.

FIG. 7 illustrates an example wireless mobile device apparatus 700 represented as a series of interrelated functional modules. A module for receiving 702 may correspond at least in some aspects to, for example, a communication device, such as WAN transceiver 204, as discussed herein. A module for calculating 704 may correspond at least in some aspects to, for example, a processing system, such as processor 210 in conjunction with processing memory 216, frequency domain buffer 218, shared memory 220, and/or overlaid CER vector module 222, as discussed herein. A module for constructing 706 may correspond at least in some aspects to, for example, a processing system, such as processor 210 in conjunction with processing memory 216, frequency domain buffer 218, shared memory 220, and/or overlaid CER vector module 222, as discussed herein. A module for determining 708 may correspond at least in some aspects to, for example, a processing system, such as processor 210, as discussed herein.

The functionality of the modules of FIG. 7 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 7, as well as other components and functions described herein, may be implemented using any suitable means. Such means also may be implemented, at least in part, using corresponding structure as taught herein. For example, the components described above in conjunction with the "module for" components of FIG. 7 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random-access memory (RAM), flash memory, read-only memory (ROM), erasable programmable read-only memory (EPROM), electrically erasable programmable read-only memory (EEPROM), registers, hard disk, a removable disk, a compact disk (CD)-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for detecting earliest arriving downlink signal peaks over all transmit diversity paths received at a same point in time, comprising:

receiving, at a wireless mobile device, a wireless signal comprised of signals transmitted from a plurality of cells, each cell of the plurality of cells providing a plurality of transmit diversity paths;

calculating, by the wireless mobile device, a channel energy response (CER) vector for each of the plurality of transmit diversity paths of each cell of the plurality of cells;

constructing, by the wireless mobile device, an overlaid CER vector for each cell of the plurality of cells, wherein the overlaid CER vector for a cell comprises an overlay of each CER vector corresponding to each of the plurality of transmit diversity paths of the cell; and determining, by the wireless mobile device, an earliest arrival path (EAP) of each cell of the plurality of cells based on the overlaid CER vector for that cell.

2. The method of claim 1, wherein there are two to four transmit diversity paths for each cell of the plurality of cells.

3. The method of claim 1, wherein each transmit diversity path of the plurality of transmit diversity paths corresponds to a transmit antenna of a cell of the plurality of cells.

4. The method of claim 1, wherein the overlaid CER vector for a cell of the plurality of cells is:

$$\text{OVERLAID\_CER}(i) = f(\text{CER\_TX0}(i), \text{CER\_TX1}(i), \text{CER\_TX2}(i), \text{CER\_TX3}(i)),$$

for an $i^{th}$ tap of the plurality of transmit diversity paths for the cell, where CER_TX0, CER_TX1, CER_TX2, and CER_TX3 are CER vectors corresponding to the plurality of transmit diversity paths of the cell, and where $f$ is an overlay function.

5. The method of claim 4, wherein the overlay function, $f$, is at least one of a maximum of taps of the CER vectors corresponding to the plurality of transmit diversity paths of the cell, an average of taps of the CER vectors corresponding to the plurality of transmit diversity paths of the cell, a signal-to-noise ratio (SNR) weighted average of taps of the CER vectors corresponding to the plurality of transmit diversity paths of the cell, a hybrid function, a dynamic function, or any combination thereof.

6. The method of claim 5, wherein the hybrid function calculates a maximum or an average of a first subset of taps of the CER vectors corresponding to the plurality of transmit diversity paths of the cell and calculates a maximum or an average of a second subset of taps of the CER vectors corresponding to the plurality of transmit diversity paths of the cell.

7. The method of claim 6, wherein the hybrid function calculates the maximum of the first subset of taps of the CER vectors corresponding to the plurality of transmit diversity paths of the cell and calculates the average of the second subset of taps of the CER vectors corresponding to the plurality of transmit diversity paths of the cell.

8. The method of claim 6, wherein the hybrid function calculates a maximum or an average of a first subset of taps of the CER vectors corresponding to the plurality of transmit diversity paths of the cell, calculates a maximum or an average of a second subset of taps of the CER vectors corresponding to the plurality of transmit diversity paths of the cell, and calculates a maximum or an average of the maximum or the average of the first subset of taps of the CER vectors corresponding to the plurality of transmit diversity paths of the cell and the maximum or the average of the second subset of taps of the CER vectors corresponding to the plurality of transmit diversity paths of the cell.

9. The method of claim 5, wherein the dynamic function switches between the maximum of taps of the CER vectors corresponding to the plurality of transmit diversity paths of the cell and the average of taps of the CER vectors corresponding to the plurality of transmit diversity paths of the cell based on channel conditions on a given transmit diversity path of the plurality of transmit diversity paths.

10. The method of claim 1, wherein each transmit diversity path of a cell of the plurality of cells transmits the same information at the same point in time.

11. The method of claim 1, wherein calculating the CER vector for each of the plurality of transmit diversity paths of each cell of the plurality of cells comprises, for each cell of the plurality of cells:
    selecting a yet unprocessed transmit diversity path of the cell;
    processing frequency domain samples for the yet unprocessed transmit diversity path;
    converting the frequency domain samples to time domain samples.

12. The method of claim 11, further comprising:
    determining whether there is a remaining unprocessed transmit diversity path of the cell; and
    in response to determining that there remains the remaining unprocessed transmit diversity path of the cell, repeating the selecting, the processing, and the converting for the remaining unprocessed transmit diversity path of the cell.

13. The method of claim 11, wherein the overlaid CER vector for the cell is calculated from the time domain samples.

14. The method of claim 11, wherein the overlaid CER vector for the cell is iteratively calculated as previously yet unprocessed transmit diversity paths of the cell are processed.

15. The method of claim 14, wherein, as a new output of the overlay function is calculated for a transmit diversity path of the plurality of transmit diversity paths of the cell, a previously stored output of the overlay function for the plurality of transmit diversity paths of the cell is overwritten by the new output.

16. The method of claim 1, wherein the EAP of each cell of the plurality of cells is determined based only on the overlaid CER vector of that cell, and
    wherein the EAP comprises the earliest peak of the overlaid CER vector of the cell.

17. The method of claim 1, further comprising:
    measuring, by the wireless mobile device, a time of arrival (TOA) of the EAP corresponding to each cell of the plurality of cells,
    wherein a location of the wireless mobile device is calculated based on the measured TOA of two or more cells of the plurality of cells.

18. The method of claim 1, further comprising:
    receiving, at the wireless mobile device, positioning assistance data from a location server, the positioning assistance data including information about the plurality of cells.

19. An apparatus for detecting earliest arriving downlink signal peaks over all transmit diversity paths received at a same point in time, comprising:
    a transceiver configured to receive a wireless signal comprised of signals transmitted from a plurality of cells, each cell of the plurality of cells providing a plurality of transmit diversity paths; and
    at least one processor configured to:
        calculate a channel energy response (CER) vector for each of the plurality of transmit diversity paths of each cell of the plurality of cells;
        construct an overlaid CER vector for each cell of the plurality of cells, wherein the overlaid CER vector for a cell comprises an overlay of each CER vector for the plurality of transmit diversity paths of the cell; and
        determine an earliest arrival path (EAP) of each cell of the plurality of cells based on the overlaid CER vector for that cell.

20. The apparatus of claim 19, wherein the overlaid CER vector for a cell of the plurality of cells is:

OVERLAID_CER($i$)=$f$(CER_TX0($i$),CER_TX1($i$), CER_TX2($i$),CER_TX3($i$)), for an $i^{th}$ tap of the plurality of transmit diversity paths for the cell, where CER_TX0, CER_TX1, CER_TX2, and CER_TX3 are CER vectors corresponding to the plurality of transmit diversity paths of the cell, and where $f$, is an overlay function.

21. The apparatus of claim 20, wherein the overlay function, $f$, is at least one of a maximum of taps of the CER vectors corresponding to the plurality of transmit diversity paths of the cell, an average of taps of the CER vectors corresponding to the plurality of transmit diversity paths of the cell, a signal-to-noise ratio (SNR) weighted average of taps of the CER vectors corresponding to the plurality of transmit diversity paths of the cell, a hybrid function, a dynamic function, or any combination thereof.

22. The apparatus of claim 21, wherein the hybrid function calculates a maximum or an average of a first subset of taps of the CER vectors corresponding to the plurality of transmit diversity paths of the cell and calculates a maximum or an average of a second subset of taps of the CER vectors corresponding to the plurality of transmit diversity paths of the cell.

23. The apparatus of claim 21, wherein the dynamic function switches between the maximum of taps of the CER vectors corresponding to the plurality of transmit diversity paths of the cell and the average of taps of the CER vectors corresponding to the plurality of transmit diversity paths of the cell based on channel conditions on a given transmit diversity path of the plurality of transmit diversity paths.

24. The apparatus of claim 19, wherein each transmit diversity path of a cell of the plurality of cells transmits the same information at the same point in time.

25. The apparatus of claim 19, wherein the at least one processor being configured to calculate the CER vector for each of the plurality of transmit diversity paths of each cell of the plurality of cells comprises the at least one processor being configured to, for each cell of the plurality of cells:
    select a yet unprocessed transmit diversity path of the cell;
    process frequency domain samples for the yet unprocessed transmit diversity path;
    convert the frequency domain samples to time domain samples.

26. The apparatus of claim 25, wherein the overlaid CER vector for the cell is calculated as previously yet unprocessed transmit diversity paths of the cell are processed.

27. The apparatus of claim 26, wherein, as a new output of the overlay function is calculated for a transmit diversity path of the plurality of transmit diversity paths of the cell, a previously stored output of the overlay function for the plurality of transmit diversity paths of the cell is overwritten by the new output.

28. The apparatus of claim 27, wherein the previously stored output of the overlay function is stored in a memory of a system on a chip (SoC).

29. An apparatus for detecting earliest arriving downlink signal peaks over all transmit diversity paths received at a same point in time, comprising:

means for receiving a wireless signal comprised of signals transmitted from a plurality of cells, each cell of the plurality of cells providing a plurality of transmit diversity paths;

means for calculating, by the wireless mobile device, a channel energy response (CER) vector for each of the plurality of transmit diversity paths of each cell of the plurality of cells;

means for constructing an overlaid CER vector for each cell of the plurality of cells, wherein the overlaid CER vector for a cell comprises an overlay of each CER vector of the plurality of transmit diversity paths of the cell; and means for determining an earliest arrival path (EAP) of each cell of the plurality of cells based on the overlaid CER vector for that cell.

30. A non-transitory computer-readable medium storing computer-executable instructions for detecting earliest arriving downlink signal peaks over all transmit diversity paths received at a same point in time, the computer-executable instructions comprising:

at least one instruction to cause a wireless mobile device to receive a wireless signal comprised of signals transmitted from a plurality of cells, each cell of the plurality of cells providing a plurality of transmit diversity paths;

at least one instruction to cause the wireless mobile device to calculate a channel energy response (CER) vector for each of the plurality of transmit diversity paths of each cell of the plurality of cells;

at least one instruction to cause the wireless mobile device to construct an overlaid CER vector for each cell of the plurality of cells, wherein the overlaid CER vector for a cell comprises an overlay of each CER vector of the plurality of transmit diversity paths of the cell; and at least one instruction to cause the wireless mobile device to determine an earliest arrival path (EAP) of each cell of the plurality of cells based on the overlaid CER vector for that cell.

* * * * *